United States Patent [19]

Dardashti

[11] Patent Number: 5,195,642
[45] Date of Patent: Mar. 23, 1993

[54] DISPLAY OR STORAGE UNIT

[76] Inventor: Shahriar Dardashti, 236 S. Oakhurst Dr., Beverly Hills, Calif. 90212

[21] Appl. No.: 859,894

[22] Filed: Mar. 30, 1992

[51] Int. Cl.⁵ ............................................. A47F 7/00
[52] U.S. Cl. ...................................... 211/41; 211/40; 211/189; 211/194
[58] Field of Search ...................... 211/189, 40, 41, 71, 211/194

[56] References Cited

U.S. PATENT DOCUMENTS

| | | |
|---|---|---|
| 3,543,943 | 1/1969 | Joy et al. |
| 3,633,761 | 1/1972 | Holliday |
| 3,889,817 | 7/1975 | Berkman |
| 3,938,665 | 2/1976 | Rumble |
| 4,228,902 | 10/1980 | Schulte |
| 4,293,075 | 10/1981 | Veralrud |
| 4,358,018 | 11/1982 | Wolfe |
| 4,453,785 | 6/1984 | Smith |
| 4,630,737 | 12/1986 | King |
| 4,655,345 | 4/1987 | Drake et al. |
| 4,702,369 | 10/1987 | Philosophe |
| 4,730,739 | 3/1988 | Semerau ............................ 211/189 |
| 4,762,689 | 8/1988 | Frey et al. ........................ 211/41 X |
| 4,819,801 | 4/1989 | Howard |
| 4,872,554 | 10/1989 | Quernemoen |
| 4,911,308 | 3/1990 | Nylund |
| 4,932,522 | 7/1990 | Milovich |
| 4,940,147 | 7/1990 | Hunt |
| 5,054,626 | 10/1991 | Stempinski ....................... 211/41 X |

OTHER PUBLICATIONS

Advertisement, Probell Handelsgesellschaft mbH, Hamburg, Germany, Circa Mar. 1991.

*Primary Examiner*—Robert W. Gibson, Jr.
*Attorney, Agent, or Firm*—Poms, Smith, Lande & Rose

[57] ABSTRACT

A display or storage unit used to hold compact or laser disc cases, video or audio tapes or cassettes, or the like. The unit may be made from a number of modular units attached to each other. Each modular unit has a number of openings used to hold cases, tapes or cassettes. The openings may be angled to facilitate holding the cases, tapes, or cassettes in place. Apertures are provided in side portions, back portions, and top or bottom plates of the modular units, which allow the modular units to be attached to each other in order to build different configurations for the display or storage unit, or to be hung on a supporting structure such as a wall. Upright units formed by the modular units may be mounted on bases using bolts to fasten bottom plates of the units to the bases.

23 Claims, 5 Drawing Sheets

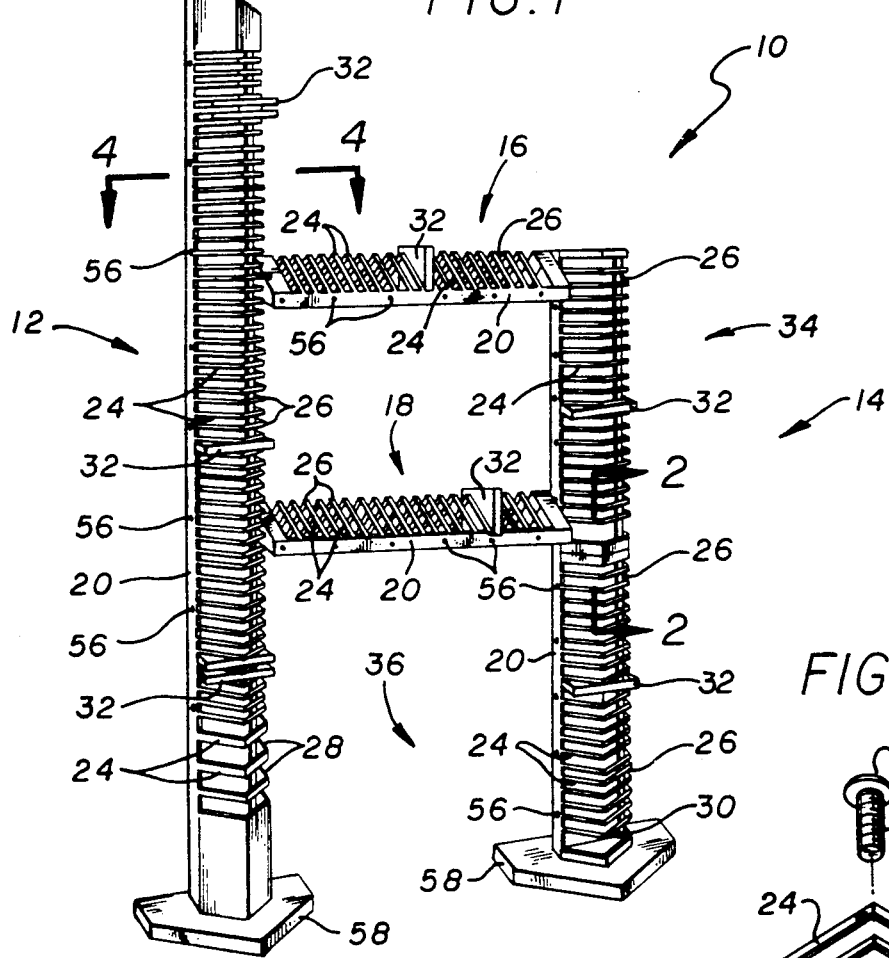
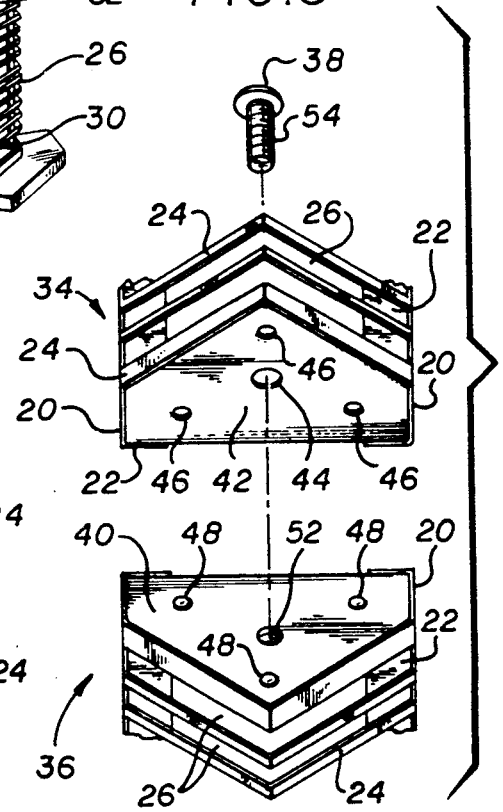
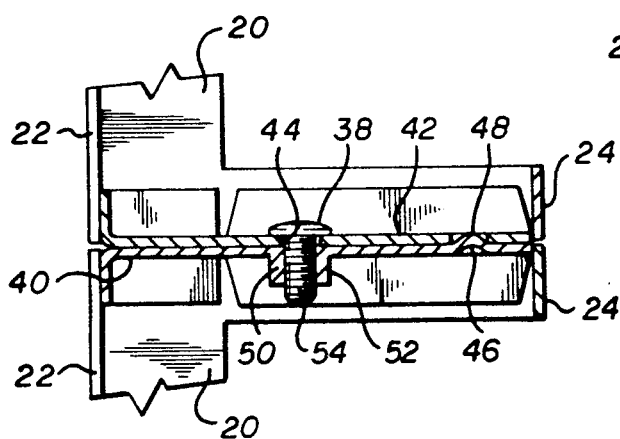
FIG. 1
FIG. 3
FIG. 2

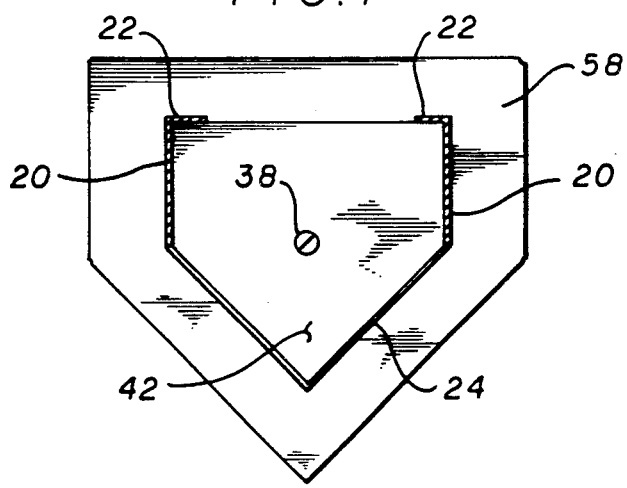
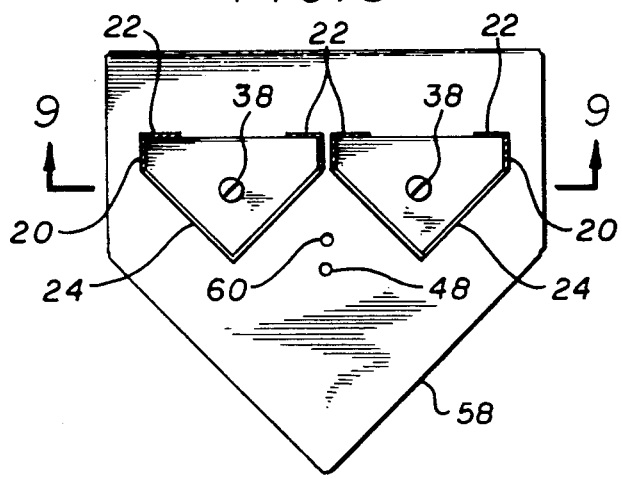
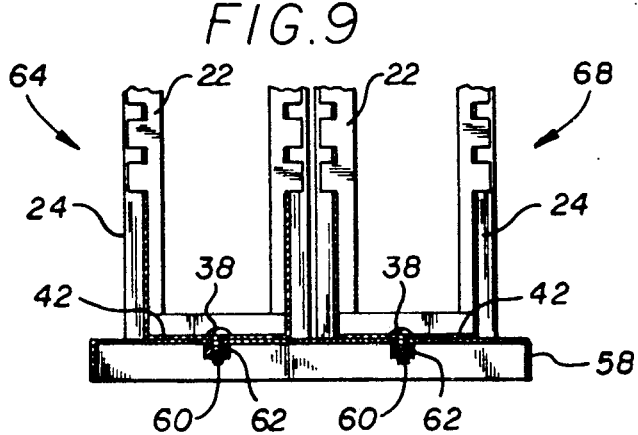
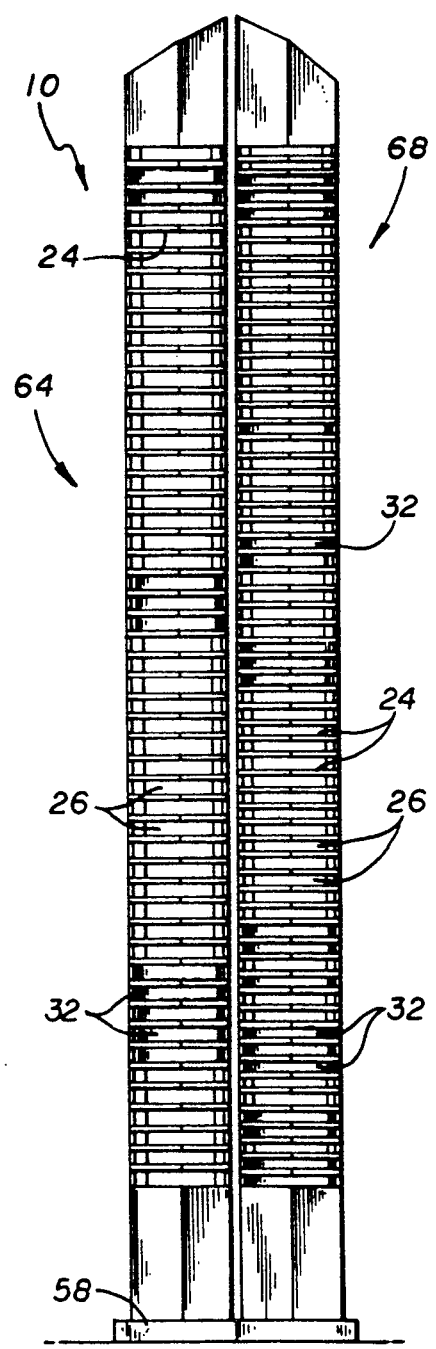

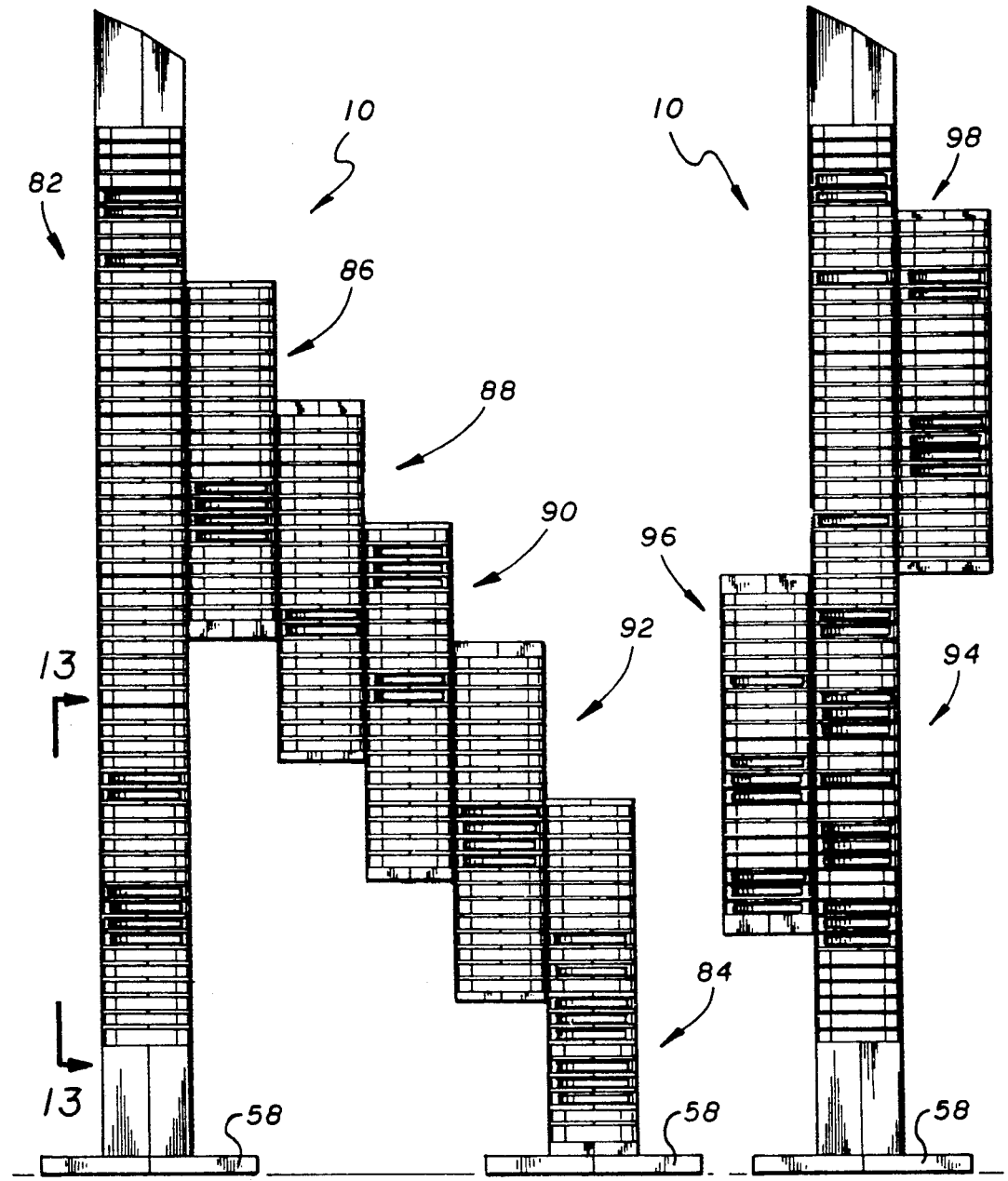

DISPLAY OR STORAGE UNIT

BACKGROUND OF THE INVENTION

The present invention relates generally to display or storage racks or units, and more particularly to display or storage units for laser or compact discs, and video or audio tapes or cassettes.

In the past, various display or storage units have been used to store, display or otherwise hold compact discs, video or audio cassettes, and other items. For example, units used to display or store compact discs are disclosed in U.S. Pat. Nos. 4,940,147, issued to Hunt on Jul. 10, 1990; 4,932,522, issued to Milovich on Jun. 12, 1990; and 4,655,345, issued to Drake et al. on Apr. 7, 1987. Display or storage racks, cabinets, or units used for albums, tape cassettes, records or the like are described in U.S. Pat. Nos. 4,819,801, issued to Howard on Apr. 11, 1989; 4,630,737, issued to King on Dec. 23, 1986; 4,453,785, issued to Smith on Jun. 12, 1984; 4,358,018, issued to Wolfe on Nov. 9, 1982; 4,293,075, issued to Veralrud on Oct. 6, 1981; 3,938,665, issued to Rumble on Feb. 17, 1976; 3,889,817, issued to Berkman on Jun. 17, 1975; and 3,543,943, issued to Joy et al. on Dec. 1, 1970.

A storage container for records is described in U.S. Pat. No. 4,702,369, issued to Philosophe on Oct. 27, 1987. Other storage or carrier units for different items are disclosed in U.S. Pat. Nos. 4,911,308, issued to Nylund on Mar. 27, 1990 (mobile plate stand); 4,872,554, issued to Quernemoen on Oct. 10, 1989 (carrier for silicon wafers); 4,228,902, issued to Schulte on Oct. 21, 1980 (carrier for semiconductive wafers); and 3,633,761, issued to Holliday on Jan. 1, 1972 (unit for storage of microfiche).

Single tower storage or display units have used a row of slots or openings to hold compact discs or other items. However, the slots or openings are of uniform size, and these units do not provide modular features that allow the units to be conveniently assembled into different configurations.

SUMMARY OF THE INVENTION

It is an object of this invention to provide a display or storage unit which may be used to display or store laser or compact discs, video or audio tapes or cassettes, or the like.

It is another object of this invention to provide a display or storage unit which may use any desirable number of modular units.

It is still another object of this invention to provide a display or storage unit which may be stood in an upright position, or hung on a supporting structure.

It is still another object of this invention to provide a display or storage unit which may be easily assembled or disassembled.

It is still another object of this invention to provide a display or storage unit which is simple and easy to use.

It is still another object of this invention to provide a display or storage unit which is economical to manufacture.

These and other objects and advantages are attained by a display or storage unit used to hold laser or compact disc cases, video or audio tapes or cassettes, or the like. The unit may be made from a number of modular units attached to each other. Each modular unit has a number of openings used to hold cases, tapes or cassettes. The openings may be angled to facilitate holding the cases, tapes, or cassettes in place. Apertures are provided in side portions, back portions, and top or bottom plates of the modular units, which allow the modular units to be attached to each other in order to build different configurations for the display or storage unit, or to be hung on a supporting structure such as a wall. Upright units formed by the modular units may be mounted on bases using bolts to fasten bottom plates of the units to the bases.

The various features of the present invention will be best understood together with further objects and advantages by reference to the following description of the preferred embodiment taken in conjunction with the accompanying drawings.

BRIEF DESCRIPTION OF THE DRAWINGS

FIG. 1 is a perspective view of a display or storage unit of the present invention having two upright units connected together by two horizontally-oriented units;

FIG. 2/ is an enlarged, detailed, cross-sectional view taken in the direction of arrows 2—2 of FIG. 1 showing how two modular units used for one of the upright units of FIG. 1 may be joined together by a bolt;

FIG. 3 is an exploded perspective view of the bolted joint of FIG. 2;

FIG. 7 is a top plan view of a base used for the display or storage unit illustrating how one of the modular units may be connected to the base by a bolt;

FIG. 8 is a top plan view of the base of FIG. 7 showing how two modular units may be connected to the base by bolts;

FIG. 9 is a cross-sectional view taken in the direction of arrows 9—9 of FIG. 8 showing how two modular units are bolted to the base;

FIG. 10 a front elevational view of another embodiment of the display or storage unit having two upright units bolted to the base a in FIGS. 8 and 9;

FIG. 11 is a front elevational view of another embodiment of the display or storage unit having two upright units mounted on bases, and from other units mounted to each other and between upright units;

FIG. 12 is a front elevational view of another embodiment of the display or storage unit having an upright unit mounted on a base, and two other units mounted on the sides of the upright unit;

DESCRIPTION OF THE PREFERRED EMBODIMENT

Figure 4:
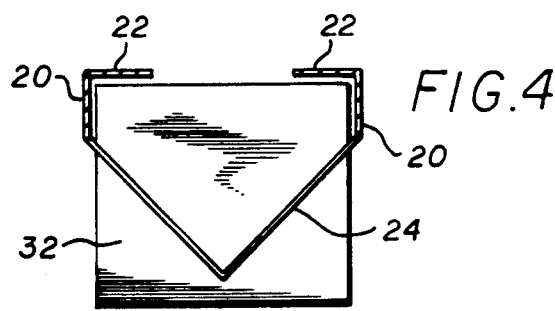
FIG. 4 is a cross-sectional view taken in the direction of arrows 4—4 of FIG. 1.

The following specification taken in conjunction with the drawings sets forth the preferred embodiment of the present invention in such a manner that any person skilled in the art can make and use the invention. The embodiment of the invention disclosed herein is the best mode contemplated by the inventor for carrying out his invention in a commercial environment, although it should be understood that various modifications can be accomplished within the parameters of the present invention.

FIG. 1 shows a display or storage unit 10 of the present invention having two upright or vertical units 12 and 14 connected together by two horizontally-oriented units 16 and 18. Each of the units 12 through 18 has longitudinal side and back portions 20 and 22 (see FIG. 4), and spaced apart front portions 24 forming slots or openings 26, 28 and 30 for holding laser or compact disc cases (for single or double compact discs), audio or video tapes or cassettes, or the like (represented by reference numeral 32). The openings 26, 28 and 30 may be of any desirable size to hold any size case, tape or cassette 32. However, the compact disc case is typically 4 ⅞ inches by 5 9/16 inches, the audio tape is typically 2 ½ inches by 3 15/16 inches, and the video cassette is typically 4 1/16 inches by 7 ⅞ inches. Also, the units 12 through 18 may have different size openings 26, 28 and 30, if desired.

As shown in FIGS. 2 and 3, unit 14 consists of two separate modular units 34 and 36 removably attached together by bolt 38. Units 12, 16 and 18 may also consist of modular units, if desired. Any number of modular units, such as units 34 and 36, may be used for any of the units 12 through 18. Also, the modular units may be of any size (length, width, etc. may vary), and have any number or size of openings 26 through 28. Typically, modular units are about 20 inches tall. In addition, the display or storage unit 10 may consist of only one tall unit, rather than a member of modular units attached together. Such a tall unit may be of any desirable height.

Each modular unit has top and bottom plates 40 and 42, respectively (see FIG. 3). Bottom plate 42 has apertures 44 and 46 therein as shown in FIG. 3. Top plate 40 has upward extensions 48 and downward extension 50 having internal threads or aperture 52 therein (see FIGS. 2 and 3). As shown in FIG. 2, apertures 46 and upward extensions 48 engage when the modular units 34 and 36 and plates 40 and 42 are attached together by inserting bolt 38 into aperture 44 and engaging bolt threads 54 into internal threads 52 of extension 50. The modular units 34 and 36 may be separated, if desired, by loosening bolt 38.

It is important to note that any type of fastener may be used to removably attach the modular units 34 and 36 together. For example, a bolt and nut may be used. Also, the units may be bolted together by passing a bolt upward. In such a case, apertures 44 and 46 would be used in plate 40, and extension 50 with threads 52 and extensions 48 would be made part of plate 42. Modular units may also be bolted together, if desired, to form upright unit 12 and horizontal units 16 and 18. Also, the same or different types of modular units may be attached together to form any height display or storage unit 10.

The modular units 34 and 36 or units 12 through 18 have apertures 56 in side portions 20 thereof. Apertures 56 may be used to attach the ends of the horizontal units 16 and 18 to the upright units 12 and 14 using, for example, nuts and bolts and apertures 44, which may be used for both the top and bottom plates 40 and 42, if desired. Also, bolt 38 may be used with internal threads 52 to attach the ends of the units 16 and 18 to upright units 12 and 14. However, any type of fastener or fastening means may be used to attach the ends of units 16 and 18 to units 12 and 14.

As shown in FIG. 1, the upright units 12 and 14 are mounted on top of bases 58. FIGS. 7 through 9 show different mounting arrangements. In the case of FIG. 7, the bolt 38 is used to attach the bottom plate 42 to the base 58 using aperture 44. Note that apertures 46 are not shown in FIG. 7, and bottom plate 42 may be fabricated with or without apertures 46. When mounted as shown in FIG. 7, bolt 38 preferably engages internal threads or apertures 60 in a downward extension 62 of the base 58 (see FIGS. 8 and 9). However, a nut and bolt, or any other type of fastener, may be used to attach bottom plate 42 to the base 58.

FIGS. 8 and 9 show two modular units or upright units attached to the base 58 side by side. Bolts 38 engaging internal threads 60 in downward extensions 62 are used to attach bottom plates 42 of the units to the base 58. Also, the base 58 preferably has upward extensions 48 which engage apertures 46 in plates 42 of the units. Any number of extensions 48 may be used for the base 58. As such, base 58 preferably has three downward extensions 62 with internal threads 60 which may be used to attach the units to the base 58. However, any desirable number of extensions 62 may be used for the base 58. FIG. 10 shows two upright units 64 and 68 mounted side by side on the base 58 forming another embodiment of the display or storage unit 10.

FIG. 4 shows how a case, tape or cassette 32 may be inserted into one of the openings 26, 28 or 30 until it comes into contact with back portions 22. Note how side portions 20 guide the case, tape or cassette 32 as it is pushed into the opening 26, 28 or 30. The top and bottom portions 24 forming the opening 26, 28 or 30 also guide the case, tape or cassette 32, and hold it in place as it rests on top of its corresponding bottom portion 24. If a user pushes downward or pulls upward on the case, tape or cassette 32 after it is inserted into opening 26, 28 or 30, then the corresponding top and bottom portions 24 will limit rotation or tilting of the case, tape or cassette 32.

Figure 5:
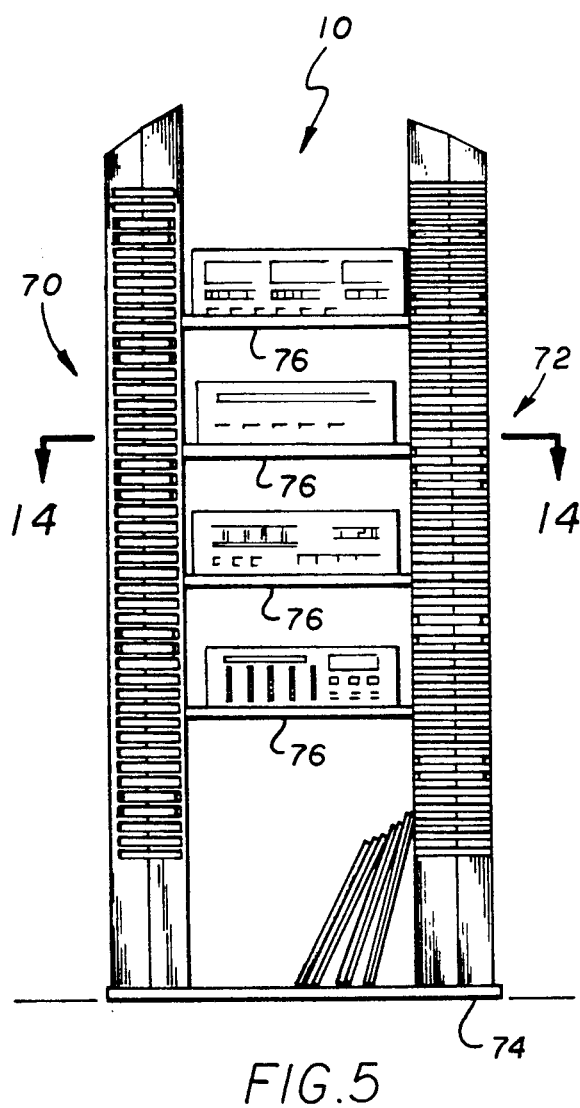
FIG. 5 front elevational view of another embodiment of the display or storage unit having two upright units connected together by horizontally-oriented shelves.

FIG. 5 shows another embodiment of the display or storage unit 10 having two upright units 70 and 72 mounted on a larger base 74. Note that two smaller bases 58 could also be used for the unit 10, if desired. Horizontally-oriented shelves 76 are mounted between the upright units 70 and 72. Ends of the shelves 76 may be attached to the side portions 20 of the units 70 and 72 using apertures 56 and any desirable fasteners. Objects may then be placed on top of the shelves 76 such as video cassette players or recorders, audio tape players, or the like.

Figure 14:
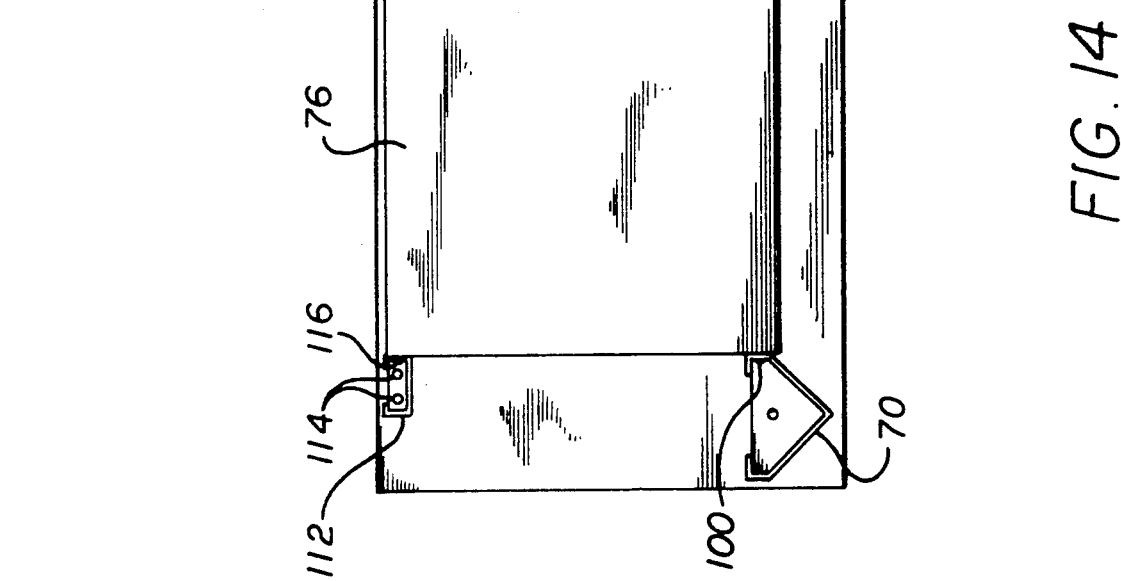
FIG. 14 is a top plan view of one of the shelves and the base of FIG. 5 taken in the direction of arrows 14—14.

FIG. 14 shows how one of the shelves 76 is attached to the units 70 and 72 by bolts 100. Vertical supports 112 attached to base 76 by bolts 114 are also attached to the shelf 76 by bolts 116 and are used to support the back of the shelf 76. Any desirable number of supports 112 may be used. Also, long or tall supports 112 may be used to support the shelf 76 or a number of supports 112 may be used between the shelves 76.

Figure 6:
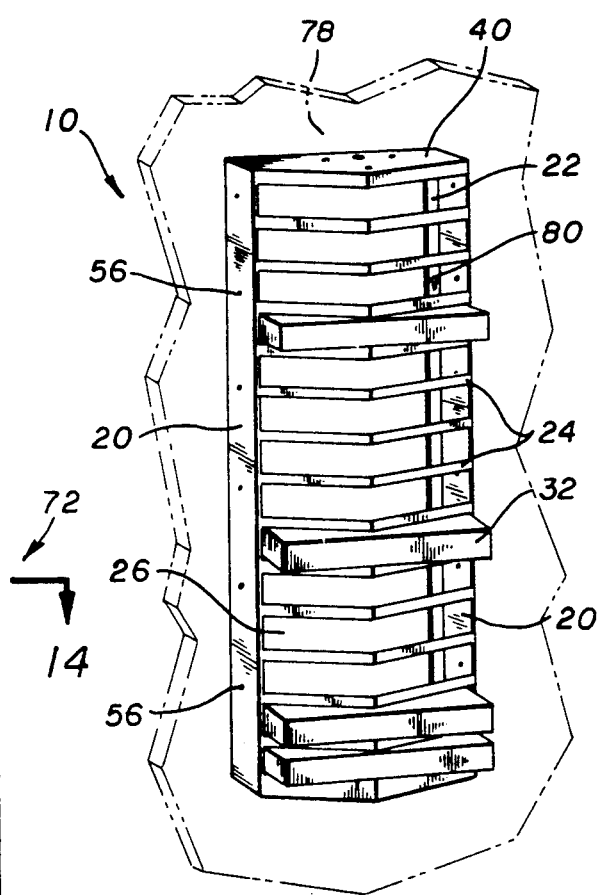
FIG. 6 is a perspective view of another embodiment of the display or storage unit shown hung on a supporting structure such as a wall.

FIG. 6 shows yet another embodiment of the display or storage unit 10 mounted or hung on a supporting structure 78 such as a wall. The unit 10 may consist of a single modular unit 36, as shown, or a number of modular units attached together. Apertures 80 are provided in back portions 22, and any suitable type of fastener may be used with the apertures 80 to mount the unit 10 on structure 78. Only one aperture 80 is shown in FIG. 6, but any desirable number of apertures 80 may be used.

Referring now to FIG. another embodiment of the display or storage unit 10 is shown having two upright units 82 and 84 mounted on bases 58, and four other units 86 through 92 mounted to each other and between the upright units 82 and 84. Apertures 56 in the side portions 20 of the units 82 through 92 are used with any desirable fasteners to attach the units to each other.

Still another embodiment of the display or storage unit 10 is shown in FIG. 12 having an upright unit 94 mounted on a base 58, and two other units 96 and 98 attached to the side portions 20 of upright unit 94 using apertures 56 and any desirable fasteners.

The modular units may be made out of metal, injection molded, or made out of any desirable material.

It is the intent of the present invention that any number of modular units may be used for the display or storage unit 10 in order to build any number of larger units oriented in any desirable manner, or to build any desirable configuration for the unit 10. Also, any number of bases 58 may be used for the unit 10.

Figure 13:
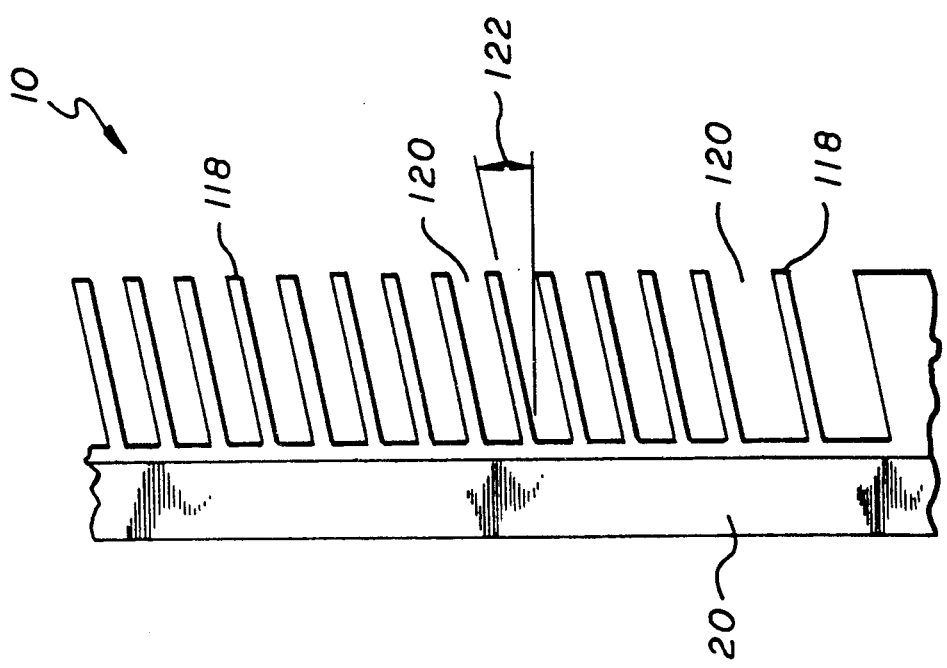
FIG. 13 is an enlarged, detailed, side view of another embodiment of the display or storage unit having angled front portions.

FIG. 13 shows another embodiment of the display or storage unit 10 having angled front portions 118 forming slots or openings 120 making an angle 122 measured from a horizontal line or plane. The angled front portions 118 form openings 120 that facilitate holding compact disc cases, tapes or cassettes in place angle 122 preferably has a range of from 10 degrees to about 30 degrees. However, any size angle 122 may be used.

The side portions 20 may have horizontal extensions (not shown) like extensions 48 which facilitate attaching modular or other units together. Also, units such as units 16 and 18 shown in FIG. 1 may be placed horizontally on top of a surface such as the top of a desk or credenza for the purpose of holding cases, tapes, or cassettes. Such horizontal units may be bolted to the disk or credenza using operation 80 (see FIG. 6).

It is important to note that modular units may be attached to each other in any order. As such, the same type of modular units may be stacked or different types may be stacked. Also, the bases 58 and 74 may have any configuration such as square, rectangular, triangular, circular, etc.

The above description discloses the preferred embodiment of the present invention. However, persons of ordinary skill in the art are capable of numerous modifications once taught these principles. For example, horizontal units may be attached to the top plates 40 of upright units, or only one end of a horizontal unit may be attached to an upright unit providing a cantilever configuration. Accordingly, it will be understood by those skilled in the art that changes in form and details may be made to the above-described embodiments without departing from the spirit and scope of the invention.

I claim:

1. A display or storage unit for selectively holding compact disc cases, tapes and cassettes, comprising a plurality of modular units removably attached together to form a desired configuration, each of said modular units including:
   side portions having apertures therein;
   back portions;
   spaced apart front portions forming openings adapted to selectively hold said cases, tapes and cassettes; and
   top and bottom plates having apertures therein adapted so that said modular units may be removably attached to one another to form said desirable configuration, selectively using said apertures in said side portions and said apertures in said top and bottom plates.

2. The display or storage unit of claim 1 further comprising a base having apertures therein adapted so that said bottom plate of said modular unit may be removably attached to said base using said apertures of said bottom plates and said apertures of said base.

3. The display or storage unit of claim 1 wherein some of said openings vary is size.

4. The display or storage unit of claim 2 wherein two of said modular units each have one said bottom plate attached to said base.

5. The display or storage unit of claim 1 wherein said apertures of said top plates have internal threads therein, and said top plates have upward extensions, each of said upward extensions adapted to engage a corresponding one of said apertures of said bottom plates.

6. The display or storage unit of claim 1 further comprising bolts used to removably attach selected numbers of said modular units together.

7. The display or storage unit of claim 1 wherein said desirable configuration includes first and second upright units formed by said modular units, and at least one substantially horizontal unit formed by said modular units and mounted between and on said first and second upright units.

8. The display or storage unit of claim 7 further comprising a base attached to a bottom of each of said first and second upright units.

9. The display or storage unit of claim 1 wherein said desirable configuration includes first and second upright units formed by said modular units, and at least one substantially horizontal shelf mounted between and on said first and second upright units.

10. The display or storage unit of claim 1 wherein said desirable configuration includes a first upright unit formed by said modular units, a base attached to a bottom of said first upright unit, and a second upright unit formed by said modular units, said first and second upright units being attached together at sides thereof.

11. The display or storage unit of claim 1 further comprising a base, said desirable configuration including first and second upright units formed by said modular units, said first and second upright units being mounted on said base.

12. The display or storage unit of claim 1 wherein said desirable configuration includes first and second upright units formed by said modular units, and at least one other upright unit formed by said modular units and mounted between said first and second upright units.

13. A display or storage unit for selectively holding cases, tapes and cassettes, comprising a plurality of modular units removably attached together to form an upright unit, and a base, said upright unit being mounted on said base, each of said modular units having openings therein adapted to selectively hold said cases, tapes and cassettes, and top and bottom plates having apertures therein adapted so that said modular units may be removably attached to one another to form said upright unit.

14. The display or storage unit of claim 13 further comprising bolts used to removably attach said modular units together.

15. The display or storage unit of claim 14 wherein said apertures in said top plates include internal threads.

16. The display or storage unit of claim 15 wherein said top plates have upward extensions, each of said upward extensions adapted to engage a corresponding one of said apertures of said bottom plate.

17. A display or storage unit for selectively holding cases, tapes and cassettes, comprising a plurality of modular units removably attached together to form a desirable configuration, each of said modular units having openings therein adapted to selectively hold said cases, tapes and cassettes, and including:

side portions having apertures therein;
   top and bottom plates; and
   means for removably attaching said modular units to one another to form said desirable configuration.

18. The display or storage unit of claim 17 wherein said means includes bolts.

19. The display or storage unit of claim 18 wherein said means further includes apertures in said bottom plates and upward extensions in said top plates, each of said upward extensions adapted to engage a corresponding one of said apertures in said bottom plates.

20. The display or storage unit of claim 17 wherein said openings are oriented at an angle.

21. A display or storage assembly for selectively holding rectangular compact disc cases, audio tapes or video cassettes, having predetermined dimensions, said assembly comprising:

rear and side members forming pairs of substantially right angle corners spaced apart by a distance slightly more than one of said predetermined dimensions to receive the rear corners of said cases or cassettes;

means including a plurality of supports extending outwardly forwardly from said side members for spacing and supporting said cases or cassettes while leaving the front corners of said cassettes free for inserting or removing said cases or cassettes from said assembly; and said supports having different spacings between adjacent supports to display or store said cases or cassettes of different types and thicknesses, said assembly including first and second units each including said rear and side members and said supports, with the first of said units having a first predetermined spacing between said supports for accommodating one type of said cases or cassettes, and the second of said units having a different spacing between said supports for accommodating a different type of said cases or cassettes; and means for removably securing said units together.

22. A display or storage unit for selectively holding compact disc cases, tapes and cassettes, comprising a plurality of modular units used to form a desirable multi-unit configuration, and a base unit, sad desirable multi-unit configuration being mounted on said base unit, each of said modular units having openings, therein adapted to selectively hold said cases, tapes and cassettes, and means for removably attaching said modular units to at least one adjacent unit to form said desirable multi-unit configuration.

23. The display or storage unit of claim 22 wherein said base includes means for securing to said base up to three of said modular units.

* * * * *